(12) United States Patent
Schrader et al.

(10) Patent No.: US 11,704,832 B2
(45) Date of Patent: Jul. 18, 2023

(54) CAMERA CALIBRATION AND/OR USE OF A CALIBRATED CAMERA (71) Applicant: Nokia Technologies Oy, Espoo (FI)

(72) Inventors: Martin Schrader, Tampere (FI); Radu Ciprian Bilcu, Tampere (FI); Adrian Burian, Tampere (FI)

(73) Assignee: Nokia Technologies Oy, Espoo (FI)

( * ) Notice: Subject to any disclaimer, the term of this patent is extended or adjusted under 35 U.S.C. 154(b) by 470 days.

(21) Appl. No.: 16/975,939

(22) PCT Filed: Mar. 14, 2018

(86) PCT No.: PCT/IB2018/051708
§ 371 (c)(1),
(2) Date: Aug. 26, 2020

(87) PCT Pub. No.: WO2019/175629
PCT Pub. Date: Sep. 19, 2019

(65) Prior Publication Data
US 2020/0402260 A1 Dec. 24, 2020

(51) Int. Cl.
*G06T 7/80* (2017.01)
*G06T 7/50* (2017.01)

(52) U.S. Cl.
CPC ............ *G06T 7/80* (2017.01); *G06T 7/50* (2017.01); *G06T 2207/10028* (2013.01)

(58) Field of Classification Search
CPC .... G06T 7/80; G06T 7/50; G06T 2207/10028
See application file for complete search history.

(56) References Cited

U.S. PATENT DOCUMENTS

| | | | | |
|---|---|---|---|---|
| 2002/0072869 | A1* | 6/2002 | Stiller | G01S 17/931 702/90 |
| 2012/0039525 | A1* | 2/2012 | Tian | H04N 13/246 382/154 |
| 2013/0010073 | A1* | 1/2013 | Do | H04N 13/257 348/46 |
| 2015/0279016 | A1 | 10/2015 | Kim et al. | |

(Continued)

FOREIGN PATENT DOCUMENTS

EP 3 279 864 A1 2/2018

OTHER PUBLICATIONS

Brooks, M.J., et al., "Revisiting Hartley's Normalized Eight-Point Algorithm", Sep. 2003, IEEE Transactions on Pattern Analysis and Machine Intelligence, IEEE Computer Society, USA, 7 pgs.

*Primary Examiner* — Molly Wilburn
(74) *Attorney, Agent, or Firm* — Harrington & Smith (57) ABSTRACT

An apparatus that calibrates a parametric mapping that maps between object points and image points. The apparatus captures an image of a calibration pattern including features defining object points. The apparatus determines, from the image, measured image points that correspond to the object points. The apparatus determines, from the mapping, putative image points that correspond to the object points. The apparatus minimizes a cumulative cost function dependent upon differences between the measured image points and putative image points to determine parameters of the parametric mapping. The mapping uses a parametric function to specify points where light rays travelling from object points to image points cross the optical axis.

19 Claims, 1 Drawing Sheet

(56) References Cited

U.S. PATENT DOCUMENTS

| | | | |
|---|---|---|---|
| 2015/0317781 A1* | 11/2015 | Napier | G06T 5/002 348/46 |
| 2016/0189358 A1* | 6/2016 | Boufarguine | G06T 7/85 348/50 |
| 2016/0275686 A1* | 9/2016 | Zach | G06V 10/761 |
| 2017/0094256 A1 | 3/2017 | Bronstein et al. | |
| 2018/0255283 A1* | 9/2018 | Li | G06V 10/774 |
| 2020/0099920 A1* | 3/2020 | Khamis | G06T 7/90 |

* cited by examiner

CAMERA CALIBRATION AND/OR USE OF A CALIBRATED CAMERA

CROSS REFERENCE TO RELATED APPLICATION

This patent application is a U.S. National Stage application of International Patent Application Number PCT/IB2018/051708 filed Mar. 14, 2018, which is hereby incorporated by reference in its entirety.

TECHNOLOGICAL FIELD

Examples in the present disclosure relate to camera calibration and also used of a calibrated camera.

BACKGROUND

The Wiley Encyclopaedia of Computer Science and Engineering, John Wiley, 2008, describes background art concerning geometric camera calibration of central cameras. The techniques for geometric camera calibration of central cameras are incorporated into computer vision libraries such as OpenCV for example.

The premise behind geometric camera calibration for a central camera is that a light ray travels from an object point in three-dimensional real space through the camera optics and a pin hole aperture to an image point in a two-dimensional surface defined by an image sensor. The camera geometry determines how the light rays are mapped from the object points to the image points and geometric camera calibration discovers the mapping.

BRIEF SUMMARY

According to various, but not necessarily all, embodiments of the invention there is provided an apparatus comprising means for calibrating a parametric mapping that maps between object points and image points, said means comprising means for: capturing an image of a calibration pattern comprising features defining object points; determining, from the image, measured image points that correspond to the object points; determining, from the mapping, putative image points that correspond to the object points; minimizing a cumulative cost function dependent upon differences between the measured image points and putative image points to determine parameters of the parametric mapping, wherein the mapping uses a parametric function to specify points where light rays travelling from object points to image points cross the optical axis.

In some but not necessarily all examples, the parametric function is a non-linear function of an angle the light ray travelling from an object point towards an image point makes with the optical axis as it crosses the optical axis.

In some but not necessarily all examples, wherein the parametric function comprises a polynomial function in the angle the light ray travelling from an object point towards an image point makes with the optical axis as it crosses the optical axis.

In some but not necessarily all examples, wherein an object point is positioned in three-dimensions by a displacement along the optical axis and a displacement from the optical axis and wherein the mapping transforms displacement along the optical axis by adding an offset defined by the parametric function.

In some but not necessarily all examples, the mapping uses a parametric function to specify a viewpoint location, on the optical axis via an entrance pupil, of an object point. In some but not necessarily all examples, the entrance pupil is variable in size. In some but not necessarily all examples, the mapping uses a parametric function to specify variation of an entrance pupil position along an optical axis with off-axis angle of incident light.

In some but not necessarily all examples, the apparatus comprises a dioptric optical system. In some but not necessarily all examples, the apparatus consists of an optical system that is a dioptric optical system.

In some but not necessarily all examples, the field of view of the camera is greater than 60°.

According to various, but not necessarily all, embodiments of the invention there is provided a method of calibrating a camera by calibrating a parametric mapping that maps between object points and image points, the method comprising: capturing an image of a calibration pattern comprising features defining object points; from the image, determining measured image points that correspond to the object points; from the mapping, determining putative image points that correspond to the object points; minimizing a cumulative cost function dependent upon differences between the measured image points and putative image points to determine parameters of the parametric mapping, wherein the mapping uses a parametric function to specify points where light rays travelling from object points to image points cross the optical axis.

In some but not necessarily all examples, the parametric function is a non-linear function of an angle the light ray travelling from an object point towards an image point makes with the optical axis as it crosses the optical axis.

In some but not necessarily all examples, the parametric function comprises a polynomial function in the angle the light ray travelling from an object point towards an image point makes with the optical axis as it crosses the optical axis.

In some but not necessarily all examples, an object point is positioned in three-dimensions by a displacement along the optical axis and a displacement from the optical axis and wherein the mapping transforms displacement along the optical axis by adding an offset defined by the parametric function.

In some but not necessarily all examples, the mapping uses a parametric function to specify a viewpoint location, on the optical axis via an entrance pupil, of an object point. In some but not necessarily all examples, the entrance pupil is variable in size.

In some but not necessarily all examples, the mapping uses a parametric function to specify variation of an entrance pupil position along an optical axis with off-axis angle of incident light.

In some but not necessarily all examples, the image of the calibration is captured via a dioptric optical system.

In some but not necessarily all examples, the field of view of the camera is greater than 120° or greater than 150°.

According to various, but not necessarily all, embodiments of the invention there is provided a camera comprising:

means for calibrating a parametric mapping that maps between object points and image points, said means comprising:
  means for capturing an image of a calibration pattern comprising features defining object points;
  means for determining, from the image, measured image points that correspond to the object points
  means for determining, from the mapping, putative image points that correspond to the object points means for minimizing a cumulative cost function dependent upon differences between the measured image points and putative image points to determine parameters of the parametric mapping, wherein the mapping uses a parametric function to specify points where light rays travelling from object points to image points cross the optical axis.

According to various, but not necessarily all, embodiments of the invention there is provided an apparatus comprising:

at least one processor; and at least one memory including computer program code the at least one memory and the computer program code configured to, with the at least one processor, cause the apparatus at least to perform calibrating a parametric mapping that maps between object points and image points by performing:

determining, from a captured image of a calibration pattern comprising features defining object points, measured image points that correspond to the object points;

determining, from the mapping, putative image points that correspond to the object points;

minimizing a cumulative cost function dependent upon differences between the measured image points and putative image points to determine parameters of the parametric mapping, wherein the mapping uses a parametric function to specify points where light rays travelling from object points to image points cross the optical axis.

In some but not necessarily all examples, the apparatus comprises one image sensor. In some but not necessarily all examples, the apparatus comprises multiple image sensors.

According to various, but not necessarily all, embodiments of the invention there is provided a calibration computer program that when loaded by a processor enables:

calibrating a parametric mapping that maps between object points and image points by capturing an image of a calibration pattern comprising features defining object points;

determining, from an image of a calibration pattern comprising features defining object points that has been captured by a camera, measured image points that correspond to the object points;

determining, from the mapping, putative image points that correspond to the object points minimizing a cumulative cost function dependent upon differences between the measured image points and putative image points to determine parameters of the parametric mapping, wherein the mapping uses a parametric function to specify points where light rays travelling from object points to image points cross the optical axis.

According to various, but not necessarily all, embodiments of the invention there is provided an apparatus comprising means for:

determining, from an image captured using a calibrated camera, image points that correspond to object points;

using a parametric mapping that maps between object points and image points using a parametric function to specify points where light rays travelling from object points to image points cross the optical axis to perform one or more of:

determine putative image points that correspond to the object points;

modify the image;

determine a measurement based on object points; or determine a position of the camera.

According to various, but not necessarily all, embodiments of the invention there is provided a method of comprising:

from an image, captured using a calibrated camera, determining image points that correspond to object points;

using a parametric mapping that maps between object points and image points using a parametric function to specify points where light rays travelling from object points to image points cross the optical axis to:

determine putative image points that correspond to the object points;

modify the image;

determine a measurement based on object points; or determine a position of the camera.

According to various, but not necessarily all, embodiments of the invention there is provided a camera comprising:

means for determining, from an image captured using a calibrated camera, image points that correspond to object points;

means for using a parametric mapping that maps between object points and image points using a parametric function to specify points where light rays travelling from object points to image points cross the optical axis to perform one or more of:

determine putative image points that correspond to the object points;

modify the image;

determine a measurement based on object points; or determine a position of the camera.

According to various, but not necessarily all, embodiments of the invention there is provided a computer program that when loaded by a processor enables:

determining, from an image captured using a calibrated camera, image points that correspond to object points; and using a parametric mapping that maps between object points and image points using a parametric function to specify points where light rays travelling from object points to image points cross the optical axis to perform one or more of:

determine putative image points that correspond to the object points;

modify the image;

determine a measurement based on object points; or determine a position of the camera.

According to various, but not necessarily all, embodiments of the invention there is provided an apparatus comprising:

at least one processor; and at least one memory including computer program code the at least one memory and the computer program code configured to, with the at least one processor, cause the apparatus at least to perform:

determining, from an image captured using a calibrated camera, image points that correspond to object points; and using a parametric mapping that maps between object points and image points using a parametric function to specify points where light rays travelling from object points to image points cross the optical axis to perform one or more of:

determine putative image points that correspond to the object points; modify the image;

determine a measurement based on object points; or determine a position of the camera.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

The premise behind geometric camera calibration is that a light ray travels from an object point in three-dimensional real space through the camera optics and aperture to an image point in a two-dimensional surface defined by an image sensor. The camera geometry determines how the light rays are mapped from the object points to the image points and geometric camera calibration discovers the mapping.

The central camera model assumes that the camera aperture is a pin hole. This assumption is not always valid.

The central camera/pin hole aperture assumption may introduce errors. The central camera/pin hole aperture assumption may introduce errors for wide-field of view cameras such as fisheye cameras.

We will use a non-central camera model that assumes a larger aperture (a larger entrance pupil) and the calibration process will account for this larger, non point-like aperture.

Let us consider a mapping M that maps object points at R to an image point at r:

$$r = M\, R$$

R is a three-dimensional vector (X, Y, Z) positioning an object point in real space. It may be expressed, for example, as $[X, Y, Z, 1]^T$.

r is a two-dimensional vector (x, y). It may, for example, be expressed as $[x, y, 1]^T$. It positions an image point in an image plane of the camera.

M is a mapping that maps the vector R to the vector r. The image point r is the projection of the object point R through the mapping M.

As will be explained below, the mapping will allow light rays travelling from object points to image points to cross the optical axis at different locations.

The mapping M may be expressed as a series of transforms.

$$M = A\, D\, E$$

The transform E is an extrinsic transform. The transform D is a distortion transform. The transform A is an intrinsic transform.

The transform E is an extrinsic transform. It is typically a joint rotation-translation transform of the form [R,t] where R is a three dimensional rotation matrix and t is a translation vector.

Thus E may have the form $$\begin{pmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{pmatrix}$$

let $$r' = \begin{pmatrix} x' \\ y' \\ z' \end{pmatrix} = \begin{pmatrix} r_{11} & r_{12} & r_{13} & t_1 \\ r_{21} & r_{22} & r_{23} & t_2 \\ t_{31} & r_{32} & r_{33} & t_3 \end{pmatrix} \begin{pmatrix} X \\ Y \\ Z \\ 1 \end{pmatrix}$$

The extrinsic transform E is the same linear mapping between object points and image points in a captured image. It accounts for relative movement of the imaged scene and camera between image captures or, if two images are captured simultaneously from different image sensors the different perspective of the image sensors.

The distortion transform D maps $r' = \begin{pmatrix} x' \\ y' \\ z' \end{pmatrix}$ to $r'' = \begin{pmatrix} x'' \\ y'' \\ z'' \end{pmatrix}$ $$D = X(\theta) \begin{pmatrix} \cos \phi & 0 & 0 \\ 0 & \sin \phi & 0 \\ 0 & 0 & 1 \end{pmatrix}$$

where
$\theta = \tan^{-1}[(X^2+Y^2)^{1/2}/Z]$, the angle of the object point (X, Y, Z) measured form the optical centre (0, 0, 0) relative to the optical axis (X=0, Y=0).

$\emptyset = \tan^{-1}[y'/x']$, the angle of the image point (x', y') in the image plane relative to the optical axis (x'=0, y'=0).

The mapping $X(\theta)$ is a distortion model. It may model radial distortion and/or tangential distortion. However, radial distortion is typically much greater than tangential distortion.

Without loss of generality, the example below will use radial distortion only. One example form of $X(\theta)$ is:

$$X(\theta) = u(1 + k_1 u^2 + k_2 u^4 + k_3 u^6 + k_4 u^8)$$

where u is a function of $\theta$.

$u = \theta$ for an equidistance, also known as equiangular, projection model.

Other projection models may be used. For example:

$$u = 2\, \tan\!\left(\frac{\theta}{2}\right) \text{ for a stereographic projection model}$$

$$u = 2\, \sin\!\left(\frac{\theta}{2}\right) \text{ for a equisolid angle,}$$

also known as equiarea, projection model
$u = \sin(\theta)$ for an orthographic projection model
$u = \tan(\theta)$ for a perspective projection model.

Without loss of generality, the example below will use radial distortion and an equiangular projection model.

The intrinsic transform A represents the camera matrix. It comprises in combination of at least a two-dimensional translation matrix $$T = \begin{pmatrix} 1 & 0 & c_x \\ 0 & 1 & c_y \\ 0 & 0 & 1 \end{pmatrix}$$

where $(c_x, c_y)$ is the principal point which is normally the image center, and a two-dimensional scaling matrix $$S = \begin{pmatrix} f_x & 0 & 0 \\ 0 & f_y & 0 \\ 0 & 0 & 1 \end{pmatrix},$$

where $f_x$ and $f_y$ are scale factors.

In some examples, the intrinsic transform A may also comprise a two-dimensional skew matrix $$\begin{pmatrix} 1 & \gamma & 0 \\ 0 & 1 & 0 \\ 0 & 0 & 1 \end{pmatrix}$$

where $\gamma$ is a measure of skewness.

Without loss of generality, the example below will use an intrinsic transform A based on translation and scaling only, $$A = \begin{pmatrix} f_x & 0 & c_x \\ 0 & f_y & c_y \\ 0 & 0 & 1 \end{pmatrix}.$$

The intrinsic transform A maps $$r'' = \begin{pmatrix} x'' \\ y'' \\ z'' \end{pmatrix} \text{ to } r = \begin{pmatrix} x \\ y \\ z \end{pmatrix}$$

$$r = \begin{pmatrix} x \\ y \\ z \end{pmatrix} = \quad (1)$$

$$X(\theta) \begin{pmatrix} f_x & 0 & c_x \\ 0 & f_y & c_y \\ 0 & 0 & 1 \end{pmatrix} \begin{pmatrix} \cos \phi & 0 & 0 \\ 0 & \sin \phi & 0 \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z \\ 1 \end{pmatrix}$$

Thus considering a single image $x'=X(\theta)*f_x*\cos \phi + c_x$, $y'=X(\theta)*f_y*\sin \phi + c_y$.

For the equidistance (also known as equiangular) projection model $X(\theta)$ is $\theta*(1+k_1\theta^2+k_2\theta^4+k_3\theta^6+k_4\theta^8)$ It should be noted that other forms of $X(\theta)$ are possible. It may, for example, be combined with the scaling matrix S of the intrinsic transform to create a polynomial in terms of r ($r^2=x^2+y^2$) and distortion parameters $\{k_i'\}$ instead of a polynomial in terms of $\theta$ and distortion parameters $\{ki\}$.

In other examples, $X(\theta)$ may be expressed as a quotient of polynomials. e.g. $(1+k'_1 r^2+k'_2 r^4+k'_3 r^6)/(1+k'_4 r^2+k'_5 r^4+k'_6 r^6)$ Finally $$r = \begin{pmatrix} x \\ y \\ z \end{pmatrix} = \quad (1)$$

$$X(\theta) \begin{pmatrix} f_x & 0 & c_x \\ 0 & f_y & c_y \\ 0 & 0 & 1 \end{pmatrix} \begin{pmatrix} \cos \phi & 0 & 0 \\ 0 & \sin \phi & 0 \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z \\ 1 \end{pmatrix}$$

is adapted to take account of the NON-CENTRAL camera aperture.

The non-central characteristic of the camera is modelled in the geometric calibration and transform M as an offset $\Delta Z(R)$ for each object point R.

$Z \rightarrow Z + \Delta Z$

An object point R is positioned in three-dimensions by a displacement (Z) along the optical axis and a displacement (X, Y) from the optical axis. The new mapping M transforms displacement (Z) along the optical axis by adding an offset $\Delta Z$ defined by a parametric function. The parametric function specifies a viewpoint location, on the optical axis via an entrance pupil, of the object point. A viewpoint is where a light ray travelling from the object point to image point crosses the optical axis.

The camera is symmetric about the optical axis and there the offset $\Delta Z(R)$ may be expressed in terms of the off-axis angle $\theta$ of incident light relative to the optical axis. The parametric function may therefore specify variation of an entrance pupil position along an optical axis with off-axis angle $\theta$ of incident light.

For example, $\Delta Z = V(\theta)$ $$r = \begin{pmatrix} x \\ y \\ z \end{pmatrix} = X(\theta) \begin{pmatrix} f_x & 0 & c_x \\ 0 & f_y & c_y \\ 0 & 0 & 1 \end{pmatrix} \quad (2)$$

$$\begin{pmatrix} \cos \phi & 0 & 0 \\ 0 & \sin \phi & 0 \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z+V(\theta) \\ 1 \end{pmatrix}$$

i.e.

$$r = M \; R' \text{ where } R' = \begin{pmatrix} X \\ Y \\ Z+V(\theta) \\ 1 \end{pmatrix}$$

where $\theta = \tan^{-1}[(X^2+Y^2)^{\frac{1}{2}}/(Z+V(\theta))]$, the maximum angle of a light ray from the object point (X, Y, Z) through the aperture measured relative to the optical axis (X=0, Y=0).

The parametric function $V(\theta)$ may be a non-linear function of the angle $\theta$ that the light ray travelling from an object point towards an image point makes with the optical axis as it crosses the optical axis.

The geometric calibration of the camera now involves not only the determination of the intrinsic parameters e.g. scaling parameters $f_x$, $f_y$ and translation parameters $c_x$, $c_y$, the distortion transform $X(\theta)$ but also the viewpoint offset $V(\theta)$.

CALIBRATION

The geometric calibration starts with using the camera to capture an image of a scene. In one example, the geometric calibration starts with using the camera to capture an image of a two-dimensional calibration pattern. In some but not necessarily all examples, the calibration pattern comprises N easily detectable features $f_i$ at known relative positions $R_i$ in the 2D plane. This creates an object set of vectors $\{R_i\}$.

Calibration comprises determining the intrinsic parameters e.g. scaling parameters $f_x$, $f_y$, and translation parameters $c_x$, $c_y$, the distortion transform $X(\theta)$ and the viewpoint offset $V(\theta)$.

Optionally, the calibration for the non-central camera may be considered as a 'perturbation' from the central camera model. In this approach, the calibration is first carried out assuming a central camera model to give an initial estimate of some of the intrinsic parameters of the central camera and then calibration is continued using the estimated intrinsic parameters of the central camera model as the initial conditions for calibration using the non-central camera model.

For example, the calibration is first carried out assuming a central camera model to give an initial estimate of some of the intrinsic parameters of the central camera by:
assuming a pin hole $V(\theta)=0$
assuming no distortion $X(\theta)=0$
assume no movement of camera and calibration pattern during imaging e.g. choose a basis such that $E=I$.
Then $$r = M\,R$$

reduces to $r = A\,R$ where A is a constant for all N of the features $f_i$.

$[r_1;r_2;\ldots r_i;\ldots r_N]=[R_1;R_2;\ldots R_i;\ldots R_N]A$
$A=[R_1;R_2;\ldots R_i;\ldots R_N]^{-1}[r_1;r_2;\ldots r_i;\ldots r_N]$ where $[R_1;R_2;\ldots R_i;\ldots R_N]^{-1}$ is the right pseudo inverse of $[R_1;R_2;\ldots R_i;\ldots R_N]$ The problem may now be solved using linear algebra. For example the standard camera calibration algorithms of OpenCV may be used or the pinv( ) function in Octave, for example.

This provides an initial estimate of some of the intrinsic parameters of the central camera. The calibration is continued using the estimated intrinsic parameters of the central camera model as the initial conditions for calibration using the non-central camera model.

Alternatively the calibration using the non-central camera model may be performed using different initial conditions, for example standard initial conditions or randomly selected initial conditions.

By setting a generalized parametric form for $X(\theta)$ and the viewpoint offset $V(\theta)$ and assumed initial conditions, then a putative transformation $$r^{(p)}_i = M\,R_i$$

can be determined for each mapping from object point $O_i$ to image point $I_i$.

The distortion transform $X(\theta)$ may be expressed as a polynomial in $\theta$, for example an odd polynomial in $\theta$ (see above)

$$X(\theta) = \theta * (1 + k_1\theta^2 + k_2\theta^4 + k_3\theta^6 + k_4\theta^8)$$

where $\{ki\}$ are the distortion parameters.

The viewpoint offset $V(\theta)$ may be expressed as a non-linear function in $\theta$, for example, a polynomial quotient in $\theta$ $$X(\theta) = \theta(q_1 + q_1\theta + q_2\theta^2)/(q_3 + q_4\theta + q_5\theta^2)$$

where $\{qi\}$ are the viewpoint offset parameters.

The polynomials may be expressed to higher orders. $V(\theta)$ may be expressed as different parametric functions using viewpoint offset parameters $\{qi\}$.

$r^{(p)}_i$ can be determined from $R_i$ for each I using non-linear optimization.

For example, a suitable cumulative cost function J can be specified using, for example the mean of the squared distance between a putative image point position $r^{(p)}_i$ of feature $f_i$ and the actual measured image point position $r^{(m)}_i$ of feature $f_i$.

$$J = \Sigma_{i=1}^{N} \|r_i^{(m)} - r_i^{(p)}\|^2$$

The parameters of M may be found by finding the parameters that minimize J. Thus the distortion parameters $\{ki\}$ and the viewpoint offset parameters $\{qi\}$ may be determined. This may also update the other intrinsic parameters e.g. scaling parameters $f_x$, $f_y$ and translation parameters $c_x$, $c_y$.

This non-linear optimization may for example be performed using linear/polynomial regression or neural networks or some other non-linear optimization technique.

It will be understood by those skilled in the art that various modifications and adjustments may be desirable to achieve convergence or achieve faster convergence such as, for example, feature scaling and learning rate adjustment.

The process can be repeated for different aperture (stop) values of the camera.

The mapping M has therefore been calibrated.

Figure 1:
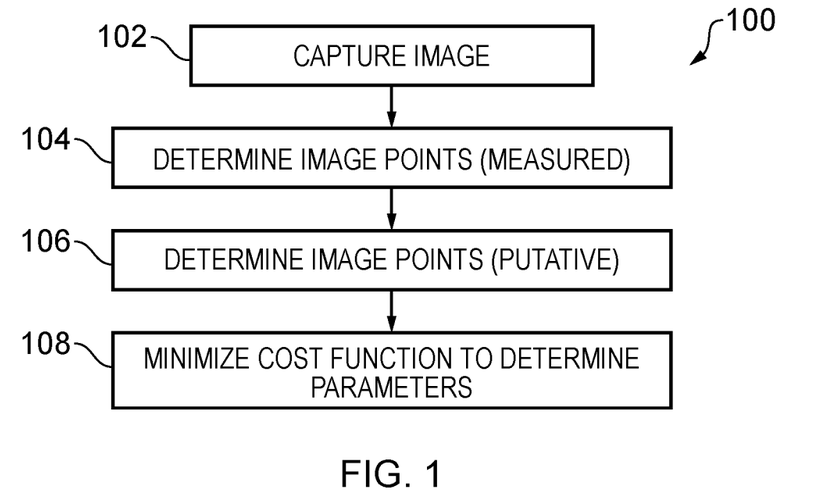
FIG. 1 illustrates an example of a method.

FIG. 1 illustrates an example of a method of calibrating a camera by calibrating a parametric mapping that maps between object points and image points.

The method 100 comprises
at block 102 capturing an image of a calibration pattern comprising features $f_i$ defining object points;
at block 104 from the image, determining measured image points that correspond to the object points;
at block 106, from the parametric mapping, determining putative image points that correspond to the object points; and
at block 108, minimizing a cumulative cost function dependent upon differences between the measured image points and putative image points to determine parameters of the parametric mapping.

An object point is positioned in three-dimensions by a displacement (Z) along the optical axis and a displacement (X, Y) from the optical axis the mapping transforms displacement (Z) along the optical axis by adding an offset defined by a parametric function. Thus the mapping uses a parametric function to specify a viewpoint location, on the optical axis via an entrance pupil, of an object point. The viewpoints are where light rays travelling from object points to image points cross the optical axis. The parametric function specifies variation of an entrance pupil position along an optical axis with off-axis angle of incident light. The parametric function comprises a non-linear function of the angle the light ray travelling from an object point towards an image point makes with the optical axis as it crosses the optical axis.

APPLICATION

The calibrated mapping M for a non-central camera can be used in the same or similar applications as a calibrated mapping M for a camera. It is however better for a larger range of cameras. It is better for cameras with large fields of view e.g. having a field of view greater than 60° or greater than 120° or 150°.

Examples of suitable applications include:
a) Determining image points r that correspond to identified object points R. For example if an object point $O_i$ has a known location $R_i$ then the location of the corresponding image point $r_i$ is determined from $$r = M\ R' \text{ where } R' = \begin{pmatrix} X \\ Y \\ Z + V(\theta) \\ 1 \end{pmatrix}.$$

b) Determining object points R that correspond to identified image points r. For example if an image point $I_i$ has a known location $r_i$ then the location of the corresponding image point $r_i$ is determined from $$r = M\ R' \text{ where } R' = \begin{pmatrix} X \\ Y \\ Z + V(\theta) \\ 1 \end{pmatrix}.$$

The pseudo inverse of M may be used to determine R' which can then be used to determine R. An image point $I_i$ in a captured image may be identified as a feature or collection of features extracted from the image.

$$r = M\ R' \text{ where } R' = \begin{pmatrix} X \\ Y \\ Z + V(\theta) \\ 1 \end{pmatrix} \quad \text{c)}$$

and M=A D E.

It may be desirable to modify the image to remove distortion i.e. find $r_{new}$=M' R' where $$R' = \begin{pmatrix} X \\ Y \\ Z + V(\theta) \\ 1 \end{pmatrix}$$

and M'=A E. The transform M may be used to find a value of R' for each pixel and then M' may be used to transform that value of R' to a new position $r_{new}$ for that pixel in the new image.

$$r = M\ R' \text{ where } R' = \begin{pmatrix} X \\ Y \\ Z + V(\theta) \\ 1 \end{pmatrix} \quad \text{d)}$$

and M=A D E. The separation between image points $I_i$($|r_i-r_j|$) may be used to determine a separation between corresponding object points Oi, Oj (|Ri-Rj|). This allows the measurement of distance in real space based on object point. It may therefore be possible to estimate an objects size or to produce a depth map that identified the depth (Z) of objects.

$$r = M\ R' \text{ where } R' = \begin{pmatrix} X \\ Y \\ Z + V(\theta) \\ 1 \end{pmatrix} \quad \text{e))}$$

and M=A D E. The variation in the transform E may be used to determine a position of the camera.

Figure 2:
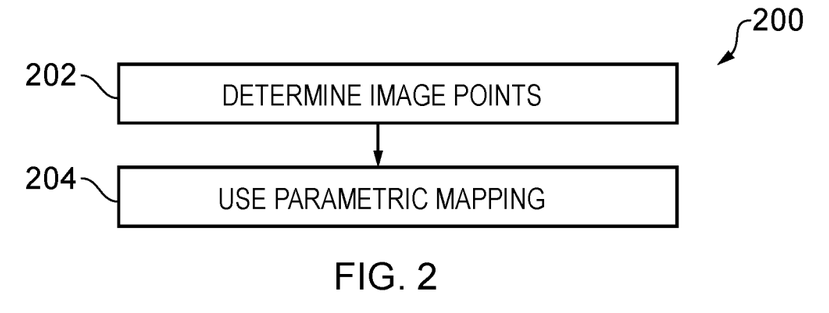
FIG. 2 illustrates an example of a method.

FIG. 2 illustrates a method 200 comprising: at block 202, from an image, captured using a calibrated camera, determining image points that correspond to object points; and at block 204, using a parametric mapping that maps between object points and image points using a parametric function to specify points where light rays travelling from object points to image points cross the optical axis to:
determine image points that correspond to object points;
determine object points that correspond to image points;
modify the image e.g. remove distortion
determine a measurement based on object points e.g. object size, depth measurement etc; or
determine a position of the camera.

Figure 3:
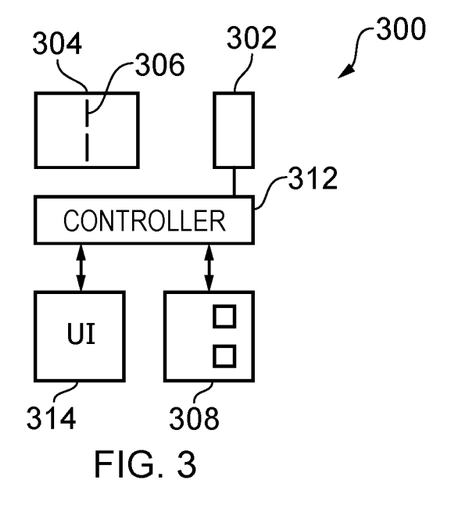
FIG. 3 illustrates an example of an apparatus.

FIG. 3 illustrates an example of a camera 300.

The camera 300 is a non-central camera. As explained above, a locus of viewpoints is specified by $V(\theta)$.

The camera comprises an image sensor 302, optics 304, memory 308, controller 312 and user interface 314.

The optics 304 define an aperture 306 (entrance pupil) of finite dimension (not a point, not central). In some but not necessarily all examples, the optics are dioptric (refractive only). In this example, in the optics are comprise one or more refractive lenses. In this example the optics 304 provide a large field of view (wide-angle). In this example, the optics provides a field of view greater than 60°, or a field of view greater than 120° or 150°, the optics 304 may be a fisheye lens.

In some but not necessarily all examples, the aperture 306 is variable is size. The entrance pupil is therefore variable in size.

Implementation of a controller 312 may be as controller circuitry. The controller 312 may be implemented in hardware alone, have certain aspects in software including firmware alone or can be a combination of hardware and software (including firmware).

In some but not necessarily all examples, an apparatus may comprise multiple cameras. In this case, the above described intrinsic calibration process is performed for each camera separately and then an extrinsic calibration process if performed to calibrate the multiple camera. Each camera comprises an image sensor 302 and optics 304. The apparatus comprises in addition to the multiple cameras a memory 308, controller 312 and user interface 314 shared by the camera. There is a different extrinsic transform E for the different cameras. The relative movement of part of an imaged scene captured from the multiple different image sensors, while the cameras are stationary, enables determination of the different extrinsic transform E for the multiple different cameras as part of an extrinsic calibration process after intrinsic calibration of each camera.

Figure 4A:
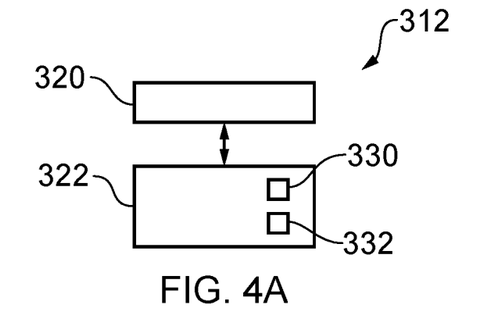
FIG. 4A illustrates an example of a controller.

As illustrated in FIG. 4A the controller 312 may be implemented using instructions that enable hardware functionality, for example, by using executable instructions of a computer program 330 in a general-purpose or special-purpose processor 320 that may be stored on a computer readable storage medium (disk, memory etc) to be executed by such a processor 320.

The processor 320 is configured to read from and write to the memory 322. The processor 320 may also comprise an output interface via which data and/or commands are output by the processor 320 and an input interface via which data and/or commands are input to the processor 320.

The memory 322 stores a computer program 330 comprising computer program instructions (computer program code) that controls the operation of the apparatus 300 when loaded into the processor 320. The computer program instructions, of the computer program 330, provide the logic and routines that enables the apparatus to perform the methods illustrated in FIGS. 1 and 2. The processor 320 by reading the memory 322 is able to load and execute the computer program 330.

The apparatus 300 therefore comprises:
at least one processor 320; and
at least one memory 322 including computer program code 330 the at least one memory 322 and the computer program code 330 configured to, with the at least one processor 320, cause the apparatus 300 at least to perform:
calibrating a parametric mapping that maps between object points and image points by
capturing an image of a calibration pattern comprising features defining object points;
determining, from an image of a calibration pattern comprising features defining object points that has been captured by a camera, measured image points that correspond to the object points;
determining, from the mapping, putative image points that correspond to the object points
minimizing a cumulative cost function dependent upon differences between the measured image points and putative image points to determine parameters of the parametric mapping,
wherein the mapping uses a parametric function to specify points where light rays travelling from object points to image points cross the optical axis.

The apparatus 300 therefore comprises:
at least one processor 320; and
at least one memory 322 including computer program code 330 the at least one memory 322 and the computer program code 330 configured to, with the at least one processor 320, cause the apparatus 300 at least to perform:
determining, from an image captured using a calibrated camera, image points that correspond to object points; and
using a parametric mapping that maps between object points and image points using a parametric function to specify points where light rays travelling from object points to image points cross the optical axis to perform one or more of:
determine putative image points that correspond to the object points; modify the image;
determine a measurement based on object points; or
determine a position of the camera.

Figure 4B:
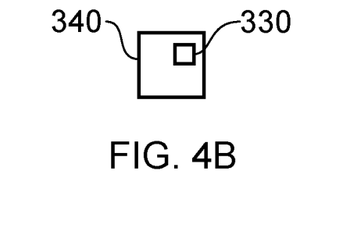
FIG. 4B illustrates an example of a computer program.

As illustrated in FIG. 4B, the computer program 330 may arrive at the apparatus 300 via any suitable delivery mechanism 340. The delivery mechanism 340 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 330. The delivery mechanism may be a signal configured to reliably transfer the computer program 330. The apparatus 300 may propagate or transmit the computer program 330 as a computer data signal.

Although the memory 322 is illustrated as a single component/circuitry it may be implemented as one or more separate components/circuitry some or all of which may be integrated/removable and/or may provide permanent/semi-permanent/dynamic/cached storage.

Although the processor 320 is illustrated as a single component/circuitry it may be implemented as one or more separate components/circuitry some or all of which may be integrated/removable. The processor 320 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1 and 2 may represent steps in a method and/or sections of code in the computer program 330. The illustration of a particular order to the blocks does not necessarily imply that there is a required or preferred order for the blocks and the order and arrangement of the block may be varied. Furthermore, it may be possible for some blocks to be omitted.

In some but not necessarily all examples, the controller 312 is configured to vary the aperture 306.

In some but not necessarily all examples, the memory 322 stores one or more data structures 332 storing the parameters of the parametric model determined by the geometric calibration—the intrinsic parameters e.g. scaling parameters $f_x$, $f_y$ and translation parameters $c_x$, $c_y$, the distortion transform $X(\theta)$ but also the viewpoint offset $V(\theta)$.

Where a structural feature has been described, it may be replaced by means for performing one or more of the functions of the structural feature whether that function or those functions are explicitly or implicitly described.

In some but not necessarily all examples, the apparatus 300 is configured to communicate data from the apparatus 300 with or without local storage of the data in a memory 322, 308 at the apparatus and with or without local processing of the data by circuitry or processors at the apparatus 300.

The data may be stored in processed or unprocessed format remotely at one or more devices. The data may be stored in The Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 300 may be part of the Internet of Things forming part of a larger, distributed network.

The recording of data may comprise only temporary recording, or it may comprise permanent recording or it may comprise both temporary recording and permanent recording. Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space of the memory 308 and can therefore be stored and retrieved until deleted or overwritten, although long-term storage may or may not occur. The use of the term 'capture' in relation to an image relates to temporary recording of the data of the image. The use of the term 'store' in relation to an image relates to permanent recording of the data of the image.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
at least one processor; and
at least one non-transitory memory storing instructions that, when executed with the at least one processor, cause the apparatus to perform:
  capturing an image of a calibration pattern comprising features defining object points;
  determining, from the image, measured image points that correspond to the object points;
  determining, from the mapping, putative image points that correspond to the object points; and
  minimizing a cumulative cost function dependent upon differences between the measured image points and putative image points to determine parameters of the parametric mapping;
  wherein the mapping uses a parametric function to specify points where light rays travelling from object points to image points cross an optical axis;
  wherein the parametric function is a non-linear function of an angle the light ray travelling from an object point towards an image point makes with the optical axis as it crosses the optical axis.

2. An apparatus as claimed in claim 1, wherein the parametric function comprises a polynomial function in the angle the light ray travelling from the object point towards the image point makes with the optical axis as it crosses the optical axis.

3. An apparatus as claimed in claim 1, wherein the object point is positioned in three-dimensions with a displacement along the optical axis and a displacement from the optical axis and wherein the mapping transforms displacement along the optical axis with adding an offset defined with the parametric function.

4. An apparatus as claimed in claim 1, wherein the mapping uses the parametric function to specify a viewpoint location, on the optical axis with an entrance pupil, of an object point.

5. An apparatus as claimed in any claim 4, wherein the entrance pupil is variable in size.

6. An apparatus as claimed in claim 4, wherein the mapping uses the parametric function to specify variation of an entrance pupil position along an optical axis with off-axis angle of incident light.

7. An apparatus as claimed in claim 1, comprising a dioptric optical system.

8. An apparatus as claimed in claim 1, wherein the field of view of the camera is greater than 60°.

9. A method of calibrating a camera with calibrating a parametric mapping that maps between object points and image points, the method comprising:
- capturing an image of a calibration pattern comprising features defining object points;
- from the image, determining measured image points that correspond to the object points;
- from the mapping, determining putative image points that correspond to the object points; and
- minimizing a cumulative cost function dependent upon differences between the measured image points and putative image points to determine parameters of the parametric mapping;
- wherein the mapping uses a parametric function to specify points where light rays travelling from object points to image points cross an optical axis;
- wherein the parametric function is a non-linear function of an angle the light ray travelling from an object point towards an image point makes with the optical axis as it crosses the optical axis.

10. A method as claimed in claim 9, wherein the parametric function comprises a polynomial function in the angle the light ray travelling from the object point towards the image point makes with the optical axis as it crosses the optical axis.

11. A method as claimed in claim 9, wherein the object point is positioned in three-dimensions with a displacement along the optical axis and a displacement from the optical axis and wherein the mapping transforms displacement along the optical axis with adding an offset defined with the parametric function.

12. A method as claimed in claim 9, wherein the mapping uses a parametric function to specify a viewpoint location, on the optical axis with an entrance pupil, of an object point.

13. A method as claimed in any claim 12, wherein the entrance pupil is variable in size.

14. A method as claimed in claim 12, wherein the mapping uses the parametric function to specify variation of an entrance pupil position along an optical axis with off-axis angle of incident light.

15. A method as claimed in claim 9, wherein the image of the calibration is captured with a dioptric optical system.

16. A method as claimed in claim 9, wherein the field of view of the camera is greater than 120° or greater than 150°.

17. An apparatus, comprising:
- at least one processor; and
- at least one non-transitory memory including computer program code, the at least one memory and the computer program code configured to, with the at least one processor, cause the apparatus at least to perform calibrating a parametric mapping that maps between object points and image points with performing:
  - determining, from a captured image of a calibration pattern comprising features defining object points, measured image points that correspond to the object points;
  - determining, from the mapping, putative image points that correspond to the object points;
  - minimizing a cumulative cost function dependent upon differences between the measured image points and putative image points to determine parameters of the parametric mapping;
  - wherein the mapping uses a parametric function to specify points where light rays travelling from object points to image points cross an optical axis;
  - wherein the parametric function is a non-linear function of an angle the light ray travelling from an object point towards an image point makes with the optical axis as it crosses the optical axis.

18. A non-transitory program storage device readable with an apparatus having a processor, tangibly embodying a program of instructions executable with the apparatus for performing operations, the operations comprising:
- determining, from an image captured using a calibrated camera, image points that correspond to object points; and
- using a parametric mapping that maps between object points and image points using a parametric function to specify points where light rays travelling from object points to image points cross an optical axis to perform one or more of:
  - determine putative image points that correspond to the object points;
  - modify the image;
  - determine a measurement based on object points; or
  - determine a position of the camera;
- wherein the parametric function is a non-linear function of an angle the light ray travelling from an object point towards an image point makes with the optical axis as it crosses the optical axis.

19. The non-transitory program storage device as in claim 18 where the instructions, when executed with the apparatus, cause the apparatus to perform:
- calibrating the parametric mapping that maps between the object points and the image points with capturing the image of a calibration pattern comprising features defining the object points;
- determining, from the image of the calibration pattern comprising the features defining the object points that has been captured with the camera, measured image points that correspond to the object points; and
- minimizing a cumulative cost function dependent upon differences between the measured image points and putative image points to determine parameters of the parametric mapping;
- wherein the mapping uses the parametric function to specify points where light rays travelling from object points to image points cross the optical axis.

* * * * *